United States Patent
Omori et al.

Patent Number: 5,473,548
Date of Patent: Dec. 5, 1995

[54] APPARATUS FOR COMPUTING POWER CONSUMPTION OF MOS TRANSISTOR LOGIC FUNCTION BLOCK

[75] Inventors: Naoko Omori; Michio Komoda, both of Itami, Japan

[73] Assignee: Mitsubishi Denki Kabushiki Kaisha, Tokyo, Japan

[21] Appl. No.: 100,117

[22] Filed: Jul. 30, 1993

[30] Foreign Application Priority Data

Aug. 5, 1992 [JP] Japan ................ 4-208891

[51] Int. Cl.⁶ .................................. G06F 17/50
[52] U.S. Cl. ........................ 364/489; 364/488
[58] Field of Search .................... 364/488, 489, 364/496, 491, 578

[56] References Cited

U.S. PATENT DOCUMENTS

| | | | |
|---|---|---|---|
| 4,698,760 | 10/1987 | Lembach et al. | 364/490 |
| 5,077,676 | 12/1991 | Johnson et al. | 364/489 |
| 5,119,314 | 6/1992 | Hotta et al. | 364/491 |
| 5,282,148 | 1/1994 | Poirot et al. | 364/491 |
| 5,295,088 | 3/1994 | Hartoog et al. | 364/578 |
| 5,349,542 | 9/1994 | Brasen et al. | 364/578 |

FOREIGN PATENT DOCUMENTS 2171861  7/1990  Japan .

OTHER PUBLICATIONS

"Electrical Optimization of PLAs" by Hedlund et al., IEEE 22nd Design Automation Conference, 1985, pp. 681–687.
"Optimization of Digital MOS VLSI Circuits" by Mark D. Matson Chapel Hill Conference, 1985, pp. 109–126.
IEEE Transactions On Computer Aided Design Of Integrated Circuits And System, Jun. 1990, pp. 642–654, Chowdhury et al., "Estimation of Maximum Currents in MOS IC Logic Circuits".
Proceedings Of The 1991 Custom Integrated Circuits Conference, May 12, 1991, pp. 8.3.1–8.3.4, Kimura et al., "Calculation of Total Dynamic Current of VLSI Using a Switch Level Timing Simulator (RSIM–FX)".

*Primary Examiner*—Vincent N. Trans
*Attorney, Agent, or Firm*—Christopher R. Pastel; Thomas R. Morrison

[57] ABSTRACT

Apparatus for computing power consumption in an MOS transistor logic function block include circuit information deriving unit for deriving circuit information appropriate for a logic function block of interest based on input and output varying signals to and from said logic function block, load capacitance data, and a net list, slew rate determining unit for determining an input slew rate based on information from said circuit information deriving unit, a memory section containing expressions for use in computation of power consumption caused by through-current, each expression corresponding to a different one of various types of logic function blocks and representing power consumption caused by through-current as a function of a slew rate and load capacitance, and power consumption determining unit for determining power consumption due to through-current by substituting the slew rate as determined by said slew rate determining unit and load capacitance data into the computation expression as read from said memory section.

12 Claims, 5 Drawing Sheets

APPARATUS FOR COMPUTING POWER CONSUMPTION OF MOS TRANSISTOR LOGIC FUNCTION BLOCK

This invention relates to an apparatus for computing power consumed by a semiconductor circuit including a plurality of macrocells including MOS transistors, and more particularly to apparatus for computing power consumption caused by "through-current" which flows through macrocells.

BACKGROUND OF THE INVENTION

A macrocell is a circuit, such as an NAND circuit and an OR circuit, or a combination of such circuits, which can perform functions desired by a user. A term "through-current" as used herein is defined as follows. For example, in a circuit including a series combination of an N-type MOS transistor (hereinafter referred to as NMOS transistor) and a P-type MOS transistor (hereinafter referred to as PMOS transistor), when, for example, the PMOS transistor changes from a nonconductive state to a conductive state and the NMOS transistor changes from a conductive state to a nonconductive state, both transistors may become conductive for some time due to difference in threshold between the PMOS and NMOS transistors. Current which flows through these two conductive transistors is called "through-current". In MOS transistor macrocells, such MOS transistor series circuits are frequently used, which often causes through-current to flow.

Power consumption in semiconductor circuits comprising macrocells when they are operating is computed in order to estimate power consumption to avoid troubles in the semiconductor circuits, such as degradation of performance of the circuits. In such computation, it is necessary to first compute power consumption in each of macrocells. Power consumption in a macrocell includes power consumption due to through-current and power consumption due to charging and discharging of load capacitance of in the macrocell.

Figure 1:
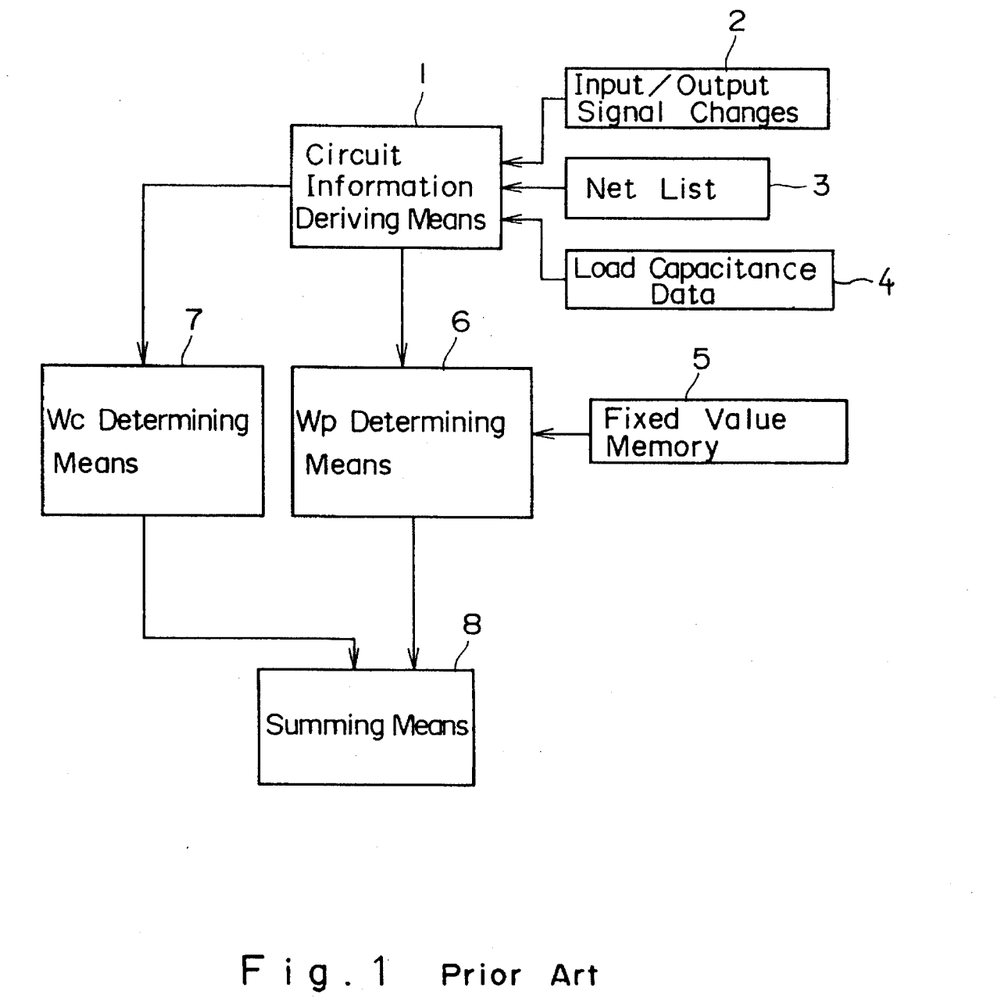
FIG. 1 is a block diagram showing an arrangement of a prior art macrocell power consumption computation apparatus.

FIG. 1 is a block diagram of a prior art apparatus for computing power consumption in one macrocell. The computation is carried out based on the results of logic simulation on a semiconductor circuit including that macrocell. In FIG. 1, circuit information deriving means 1 identifies a macrocell which has operated from data 2 relating to input/output signal variations in the logic simulation, names of macrocells, and a net list 3 storing information relating to how that macrocell is connected to other macrocells, and then derives the load capacitance of that macrocell as circuit information from load capacitance data 4.

Fixed-value storage means 5 stores a fixed value for each macrocell representing power consumption Np due to through-current in that macrocell as determined by applying a suitable input waveform and providing predetermined output load capacitance to that macrocell.

Through-current power consumption p determining means 6 reads out power consumption Np caused by through-current in a macrocell specified by circuit information deriving means 1 from fixed-value storage means 5.

Load-capacitance power consumption Nc determining means 7 computes power consumption Nc caused by charging or discharging of the load capacitance of a macrocell specified by circuit information deriving means 1. That is, means 7 computes the power consumption Wc according to well-known expressions for power consumption caused by load capacitance.

Summing means 8 sums the power consumption c and the power consumption Wp.

The above-described apparatus is for computing power consumption in one macrocell, but usually it is also necessary to compute overall power consumption of the semiconductor circuit formed of such macrocells.

Figure 2:
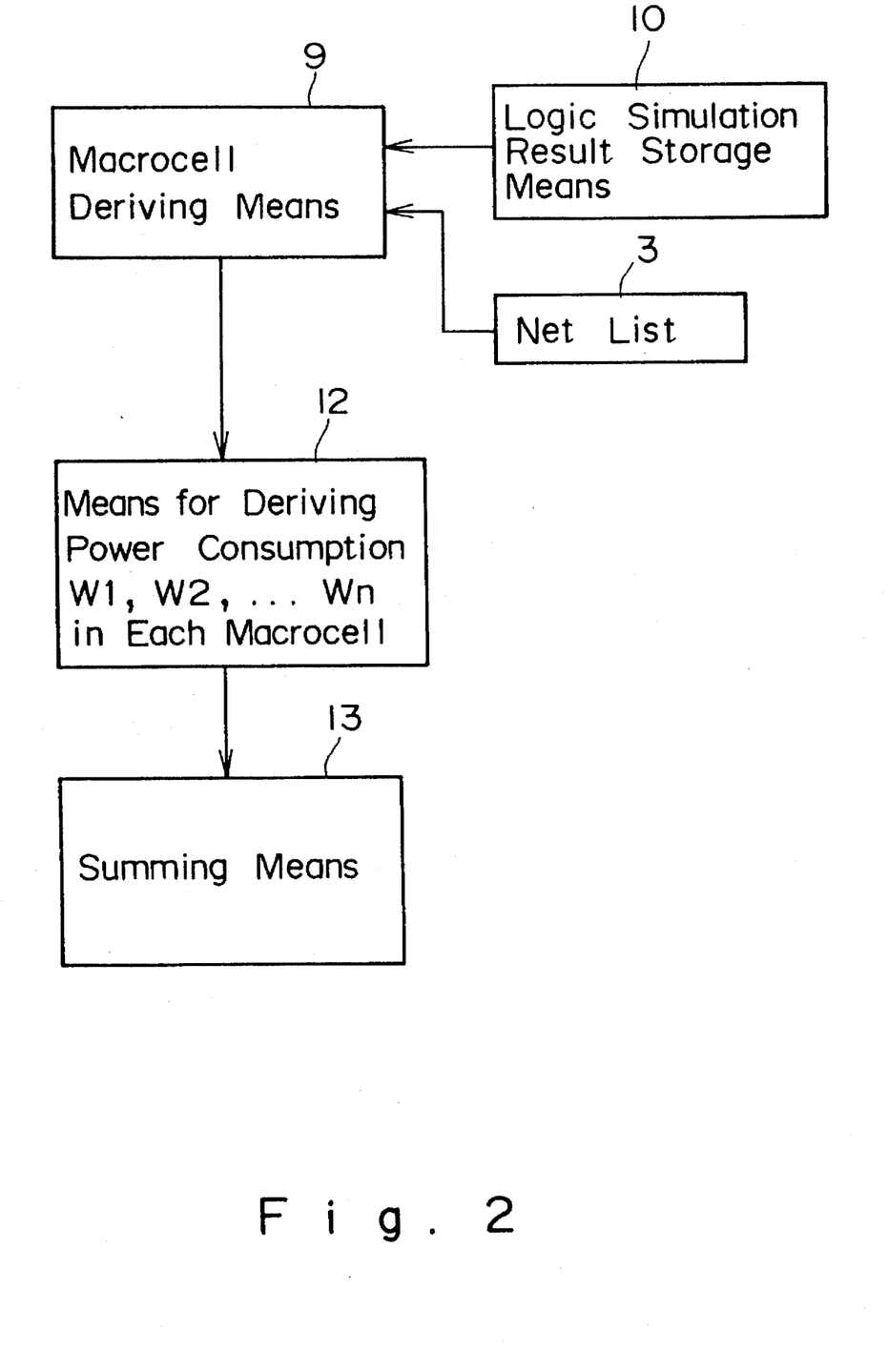
FIG. 2 is a block diagram showing a typical arrangement of an apparatus for computing power consumption in a circuit according to the prior art.

For that purpose, as shown in prior art FIG. 2, means 9 for identifying the macrocells which have operated identifies the names of the respective macrocells having input/output signal changes in logic simulation, based on information from logic simulation result storage means 10 and net list 3. Means 9 also derives the number of operation cycles per unit time.

The data is fed to means 12 for deriving therefrom power consumption W1, 2, . . . , Wn in respective macrocells, as in the power consumption computing apparatus of FIG. 1, to compute power consumed in each cycle of operation of the respective macrocells (including power consumption due to through-current and power consumption due to load capacitance). In this example, the identification of macrocells which have operated is performed by means 9.

The thus computed power consumptions in the respective ones of macrocells are summed in summing means 13 which sums power consumption W1, W2, . . . , Wn. From the number of times the respective macrocells which have been identified by means 9 as having operated, the power consumption per unit time of each macrocell is determined. For example, if a macrocell has operated three times in a unit time period, the power consumed by that macrocell in the unit time period is computed by multiplying the power consumed in one operating cycle by the number of operating cycles, three in this case. Power consumed in the unit time period in other macrocells which have been identified as having operated is computed. The power consumption is summed to produce overall power consumption in the entire semiconductor circuit.

In Japanese Unexamined Patent Publication No. HEI 2-171861 (JP-A-21 71 861), a system for computing power consumption in a CMOS gate array is disclosed. According to the teaching of this Japanese patent publication, power consumption is computed from data relating to variations in input/output signals to and from the respective macrocells of the circuit, data to load capacitance and so forth. The technique shown therein first computes an operating frequency of a macrocell of interest from the input/output signal variations and, then, uses it in computing the power consumption. When the macrocell is a NAND circuit, the power consumed by the macrocell is determined by the product of the output frequency, the load capacitance and the power consumption factor inherent to that NAND circuit. If the macrocell is a D-type flip-flop, the power consumed by the macrocell is the sum of the input signal frequency multiplied by the power consumption factor of the flip-flop and the output frequency multiplied by the load capacitance and the power consumption factor. Such computation is similar to the computation of power consumption due to load capacitance in unit time of one macrocell shown in FIG. 1 or 2. This prior art does not take power consumption caused by through-current into consideration.

Since power consumption caused by through-current is not taken into consideration in this prior art technique, power consumption cannot be computed precisely. In the systems shown in FIGS. 1 and 2, power consumption due to through-current is taken into consideration, but it is treated as a fixed value. Therefore it is impossible to compute power consumption precisely.

Actual through-current is dependent on the slope of an input signal waveform applied to a macrocell, and the shift of operating points of OS transistors of the macrocell caused by changes in charge and discharge current for an output side load capacitance of the macrocell, and, therefore, power consumption Wp due to through-current is not constant. (Hereinafter, the above-stated slope of input signal waveform is referred to as input slew rate or slew rate.)

TABLE 1 shows the result of simulation for power consumption caused by through-current in a macrocell, e.g. NAND circuit.

TABLE 1

| Load | Slew Rate | | | | |
|---|---|---|---|---|---|
| | 1.0 | 2.0 | 3.0 | 4.0 | 5.0 |
| 0.2 | 2.05 | 3.14 | 4.42 | 5.78 | 7.18 |
| 0.4 | 2.02 | 2.96 | 4.11 | 5.38 | 6.70 |
| 0.6 | 2.00 | 2.82 | 3.89 | 5.07 | 6.33 |

Figure 3:
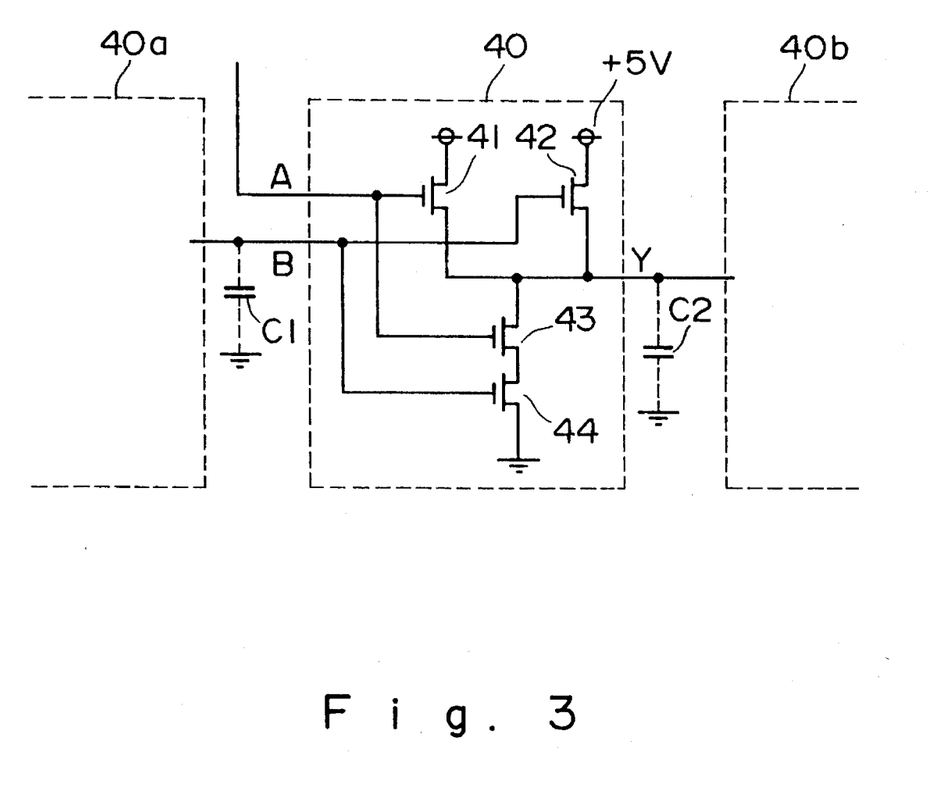
FIG. 3 is a circuit diagram of a macrocell.

TABLE 1 shows the result of simulation performed on a NAND circuit 40 shown in FIG. 3. NAND circuit 40 comprises two PMOS transistors 41 and 42 having their drain-source conduction paths connected between a +5 V voltage supply terminal and an output node Y, and also two NMOS transistors 43 and 44 having their drain-source conduction paths connected in series between output node Y and a point of reference potential. The gates of PMOS transistor 41 and NMOS transistor 43 are connected to an input terminal A, and the gates of PMOS transistor 42 and NMOS transistor 44 are connected to an input terminal B. Computation of power consumption in this circuit has been made on the assumption that input terminal A is fixed to, for example, +5 V and voltage change from +5 V to 0 V is applied to input terminal B. More specifically, initially, both input terminals A and B are at +5 V and, accordingly, both of NMOS transistors 43 and 44 are conductive, whereas both of PMOS transistors 41 and 42 are nonconductive. Therefore the voltage at output node Y is 0 V. When the voltage at input terminal B starts changing from +5 V toward 0 V, there will appear a time period during which PMOS transistor 42 and NMOS transistors 43 and 44 are all conductive, because the threshold voltage at which PMOS transistors change from nonconductive to conductive states is higher than the threshold voltage at which NMOS transistors change from conductive to nonconductive states. After that time period, NMOS transistor 44 becomes nonconductive so that output node Y becomes +5 V. Current which flows through PMOS transistor 42 and NMOS transistors 43 and 44 during the time period when these transistors 42, 43 and 44 are all conductive is "through-current".

In TABLE 1, "Slew Rate" is an input slew rate expressed in terms of nanoseconds (ns), "Load" is an output load capacitance in pico-farads (pF), and the power consumption is μ W/MHz. In this example, the slew rate is a function of an input-side overall capacitance c1 at terminal B, which is determined by the gate capacitance of each of NMOS and PMOS transistors 44 and 42, capacitance provided by metal conductors for connecting input terminal B of NAND circuit 40 to a macrocell in the preceding stage, for example, a similarly arranged NAND circuit 40a, and drain capacitance of each of MOS transistors of NAND circuit 40a corresponding to PMOS transistor 42 and NMOS transistors 43 and 44. An output-side capacitance c2 is determined by drain capacitance of each of PMOS transistor 42 and NMOS transistors 43 and 44 of NAND circuit 40, capacitance of wires for connecting NAND circuit 40 to a succeeding macrocell, e.g. an NAND circuit 40b similar to NAND CIRCUIT 40, and, further, the gate capacitance of each of MOS transistors of NAND circuit 40b corresponding to PMOS transistor 42 and NMOS transistor 44 if output node Y is connected to input terminal B' (not shown) of NAND circuit 40b. The reason why load capacitance c2 and input-side overall capacitance c1 as represented by "Slew Rate" have various values as shown in TABLE 1 is that, because the positions of NAND circuits used as NAND circuits 40a and 40b relative to NAND circuit 40 are not fixed due to circuit design, the lengths of metallic wires are different accordingly.

From TABLE 1, it is seen that in response to changes in slew rate and output-side load capacitance, power consumption in NAND circuit 40 varies in a range of from 2.00 to 7.18 μ W/MHz. However, while the actual power consumption is variable as shown, the prior art uses one fixed value within this variation range, e.g. a "true" value of 4.11 for a slew rate of 3.0 and load capacitance of 0.4, in computing the power consumption of NAND circuit 40. It is apparent that the use of such a fixed value provides less precise computation of power consumption.

An object of the present invention is to provide a power consumption computing apparatus free of the above-described disadvantages, which can compute power consumption in a macrocell precisely.

SUMMARY OF THE INVENTION

According to a feature of the present invention, an apparatus for computing power consumption in an MOS transistor macrocell (logic function block) does not use a fixed value for power consumption due to through-current, but it computes power consumption with variations depending on an input waveform slope (input slew rate) taken into account.

More specifically, a power consumption computing apparatus includes circuit information deriving means for deriving appropriate circuit information for each macrocell from input and output signal changes and information from a net list, slew rate determining means for determining an input slew rate based on information from said circuit information deriving means, a memory section in which computation expressions expressed as a function of the slew rate t, f(t), for respective ones of macrocell types for determining the term of power consumption caused by through-current, and through-current power consumption term determining means for applying a slew rate as determined by said slew rate determing means to a computation expression as read out from said memory section to determine the term of power consumption caused by through-current.

According to another feature of the present invention, an apparatus for computing power consumption in a MOS transistor macrocell does not use a fixed value for power consumption caused by through-current, but computes power consumption with variations depending on a slope of input waveform and variations depending on operating points of MOS transistors as determined by the output-side load capacitance.

More specifically, the apparatus includes circuit information deriving means for deriving appropriate circuit information for each macrocell from input and output signal changes and information from a net list, slew rate determining means for determining an input slew rate based on information from said circuit information deriving means, a memory section in which computation expressions expressed as a function of the slew rate t and a load capacitance c, f(t, c), for respective ones of logic function block types for determining the term of power consumption caused by through-current, and through-current power consumption term determining means for applying a slew rate as determined by said slew rate determining means and load capacitance data to a computation expression as read out from said memory section to determine the term of power consumption caused by through-current.

Power consumption W of a macrocell is the sum of power consumption Wp caused by through-current and power consumption Wc caused by load capacitance. According to the present invention, the term of power consumption caused by through-current is determined by an input slew rate or through-current as determined by an input slew rate and output-side load. For determining through-current power consumption term, a computation expression expressed as a function f(t), where t is a slew rate, or a computation expression expressed as a function f(t, c), where t is a slew rate and c is load capacitance, is used. In other words, according to the present invention, the term of power consumption caused by through-current is determined by an input slew rate or an input slew rate and an output-side load.

DETAILED DESCRIPTION OF EMBODIMENTS

Figure 4:
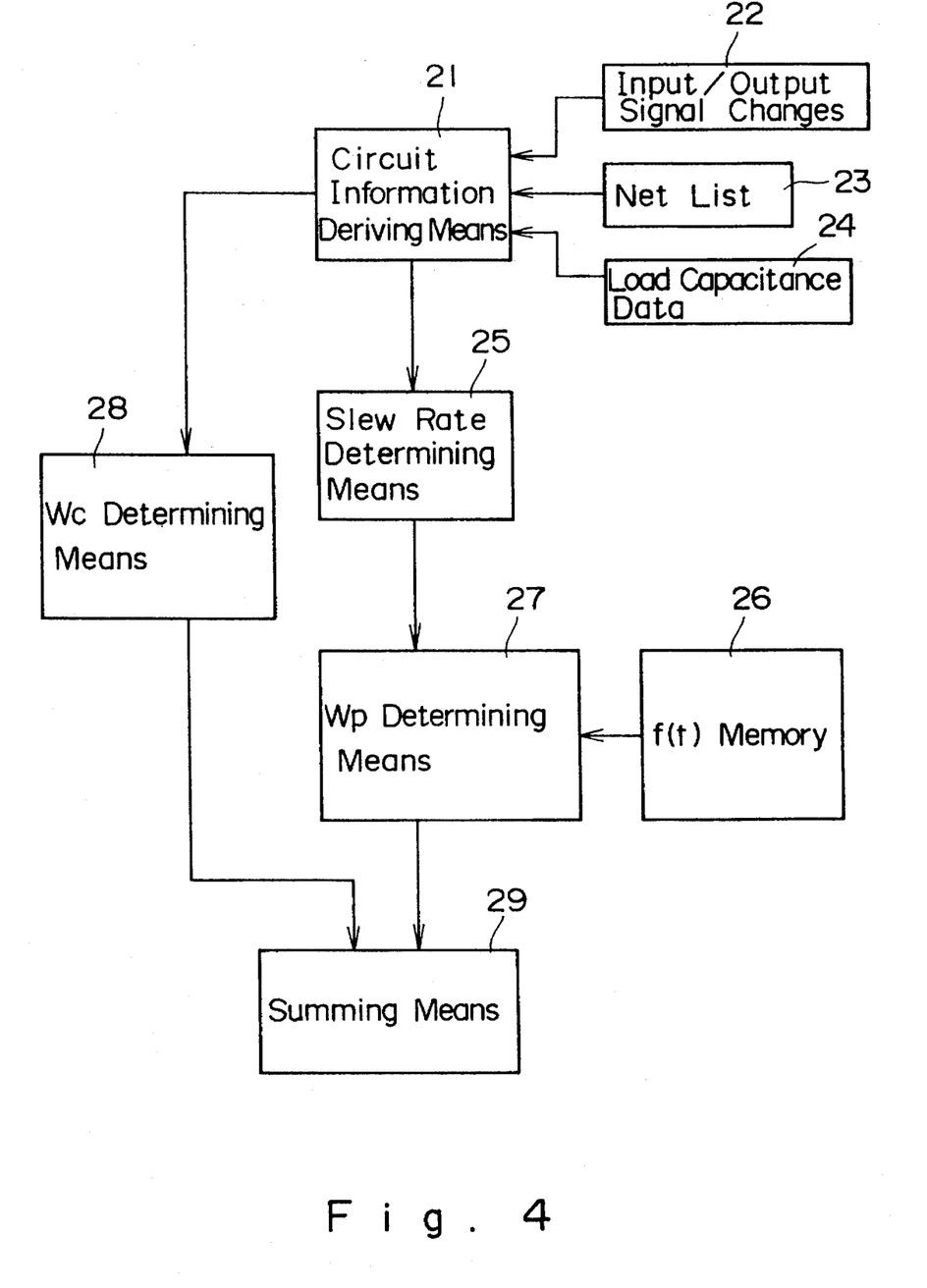
FIG. 4 is a block diagram of a macrocell power consumption computation apparatus according to a first embodiment of the present invention.

FIG. 4 shows an apparatus for computing power consumption in a macrocell according to one embodiment of the present invention. The apparatus includes circuit information deriving means 21, slew rate determining means 25, a memory section 26 for storing a function f(t) for determining power consumption Wp caused by through-current, means 27 for determining through-current power consumption Wp, means 28 for determining power consumption Wc caused by load capacitance, and means 29 for summing Wp and Wc.

Circuit information deriving means 21 derives circuit information necessary for computing power consumption in each macrocell which exhibits signal changes in simulation, i.e. input and output load capacitance for each such macrocell, based on data 22 relating to input and output signal changes in a macrocell exhibited in logic simulation, a net list 23 containing the name of that macrocell and its circuit connection information, and load capacitance data 24 which represents capacitance itself or computation parameters corresponding to gate capacitance and drain capacitance determined by characteristics of MOS transistors forming the macrocell, and capacitance provided by wires connecting that macrocell to other macrocells.

Slew rate determining means 25 determines a slew rate t of an input signal exhibiting signal changes at an input terminal of a macrocell of interest based on input-side capacitance information supplied from circuit information deriving means 21.

The term "slew rate" as used herein represents the time required for the input signal to change from O V to 5 V, for example, but usually, it represents such a time required for the input signal to change from 0.5 V to 4.5 V, i.e. the lower limit being raised by 10% of the range above and the upper limit being lowered by 10% of the range.

Wp determining function f(t) memory section 26 contains a number of computation expressions for respective types of macrocells used. Each of the expressions expresses the power consumption Wp caused by through-current by means of a function f(t) of a slew rate t (time) of each macrocell.

Means 27 for determining power consumption Wp caused by through-current reads out a computation expression for the macrocell of interest from Wp determining function memory section 26 and computes the power consumption Wp caused by through-current in the subject macrocell, using a slew rate provided by slew rate determining means 25.

Means 28 for determining the power consumption caused by load capacitance computes, based on information from circuit information deriving means 21, i.e. based on the derived output-side load capacitance of the subject macrocell, the power consumption Wc due to charging and discharging that capacitance. Means 28 computes the power consumption Wc, using a known computation expression for power consumption Wc caused by load capacitance.

Means 29 sums the Wp computed by Wp determining means 27 and Wc computed by Wc determining means 28 to produce the overall consumed power of the macrocell.

The arrangement shown in FIG. 4 is similar to that shown in FIG. 3, except that the arrangement of FIG. 4 includes slew rate determining means 25, Wp determining function memory section 26, and Wp determining means 27.

The output of this arrangement shown in FIG. 4 is applied to means corresponding to means 12 in the arrangement shown in FIG. 2 to compute the overall power consumption of the circuit comprising the macrocells when the circuit is operating.

The power consumption Wp caused by through-current is a function of a slew rate t. The computation of power consumption according to the present invention takes into account changes of power consumption caused by changes of the slope of an input waveform, and, therefore, its computation precision is higher than that of conventional techniques in which a fixed value is used for the term for power consumption caused by through-current in the computation expression. For instance, for the same macrocell (NAND circuit) used in the explanation of TABLE 1, the power consumption which changes with change in slew rate is shown in TABLE 2, which is obtained by using a computation expression, $$Wp = 0.840 + 0.123t$$

TABLE 2

| Load | Slew Rate | | | | |
|---|---|---|---|---|---|
| | 1.0 | 2.0 | 3.0 | 4.0 | 5.0 |
| 0.2 | 1.96 | 3.09 | 4.21 | 5.33 | 6.46 |
| 0.4 | 1.96 | 3.09 | 4.21 | 5.33 | 6.46 |
| 0.6 | 1.96 | 3.09 | 4.21 | 5.33 | 6.46 |

The results shown in TABLE 2 are very close to the actual power consumption shown in TABLE 1, and are much more precise than results which would obtained by using a fixed value for power consumption caused by through-current. The values shown in TABLE 2 do not change with change in load capacitance, but, depending on types of macrocells, computation precision is sufficiently improved.

Figure 5:
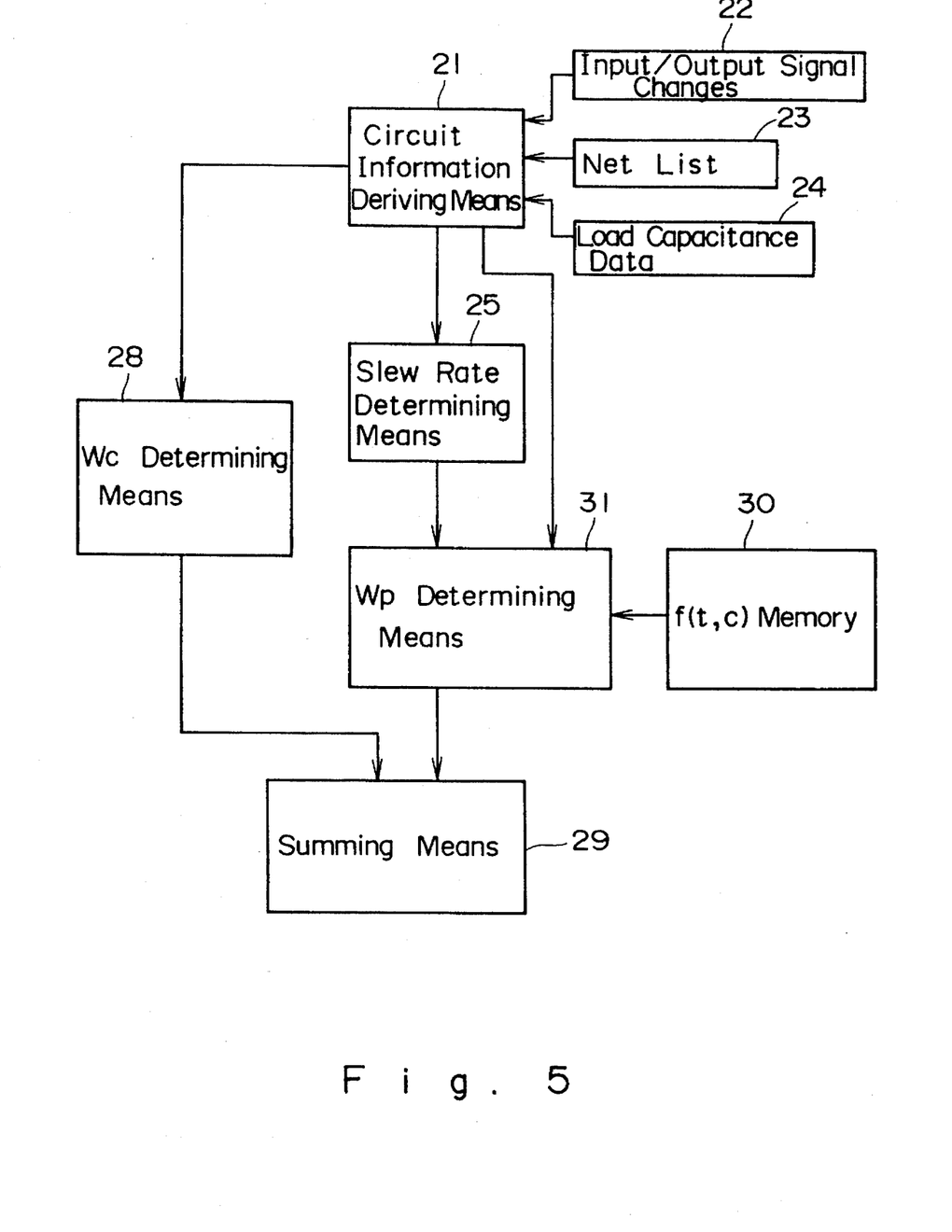
FIG. 5 is a block diagram of a macrocell power consumption computation apparatus according to a second embodiment of the present invention.

FIG. 5 is a block diagram of a macrocell power consumption computation apparatus according to a second embodiment of the present invention. The difference from the first embodiment apparatus is that in place of memory section 26 which stores Wp determining function f(t) and Wp determining means 27, a memory section 30 for storing a Wp determining function f(t, c) and Wp determining means 31 are used.

Wp determining function memory section 30 stores therein a number of computation expressions for various types of macrocells. Computation expressions are in the form of a function f(t, c) for determining power consumption Wp as a function of a slew rate t and load capacitance c of a macrocell.

The remainder of the apparatus is same as the apparatus of FIG. 4, and, therefore, no further explanation is necessary. The output of the power consumption computation apparatus of FIG. 5 is also applied to means corresponding to means 12 of FIG. 2 for determining the power consumption of a circuit when the circuit is operating.

In this embodiment, the expression for use in computing power consumption Wp caused by through-current is in the form of a function of slew rate t and load capacitance c. In the computation apparatus of this embodiment, changes in power consumption due to changes in slew rate t and load capacitance c are taken into account. In other words, changes in power consumption depending on changes in slope of the input waveform and depending on changes in the operating point of MOS transistors caused by output-side load are taken into account. This significantly improves the precision of computation relative to the prior art in which a fixed value is used for power consumption caused by through-current. For example, for the same macrocell (NAND circuit) used in explaining TABLE 1, the following computation expression may be used to obtain the results shown in TABLE 3.

$$Wp=0.834+1.291t+0.394tc$$

TABLE 3 shows power consumption of the macrocell which varies with the slew rate t and the load capacitance c.

TABLE 3

| Load | Slew Rate | | | | |
|---|---|---|---|---|---|
| | 1.0 | 2.0 | 3.0 | 4.0 | 5.0 |
| 0.2 | 2.05 | 3.26 | 4.47 | 5.68 | 6.89 |
| 0.4 | 1.97 | 3.10 | 4.23 | 5.37 | 6.50 |
| 0.6 | 1.89 | 2.94 | 4.00 | 5.05 | 6.11 |

As is seen, the values obtained as shown in TABLE 3 are very close to the actual values shown in TABLE 1, which means that the apparatus shown in FIG. 5 can provide highly precise results relative to the prior art in which a fixed value is used for the power consumption caused by through-current. Because the computation takes into account a slew rate t and load capacitance c, significant improvement in computation precision can be achieved.

The load capacitance c used in this embodiment is the same as the information used in computing power consumption due to load capacitance, and, therefore, the same information as used for computing Wc can be used. Accordingly, realization of this embodiment is easy.

In the first embodiment, the expression $Wp=\alpha+\beta t$ was used, and in the second embodiment, the expression $Wp=\alpha+\beta t-\gamma tc$ was used, where $\alpha$, $\beta$ and $\gamma$ are constants. However, other computation expression may be used instead.

What is claimed is:

1. Apparatus for computing power consumption in an MOS transistor logic function block, comprising:

circuit information deriving means for deriving circuit information appropriate for a logic function block of interest based on a plurality input and output varying signals to and from said logic function block and a net list;

slew rate determining means for determining an input slew rate based on information from said circuit information deriving means;

a memory section containing expressions for use in computation of power consumption caused by a through-current, each expression corresponding to a different one of various types of logic function blocks and representing power consumption caused by said through-current as a function of said input slew rate; and means for determining power consumption due to said through-current by substituting said input slew rate as determined by said slew rate determining means into a computation expression as read from said memory section.

2. Apparatus for computing power consumption in an MOS transistor logic function block according to claim 1, further comprising:

means for determining power consumption caused by a load capacitance; and means for summing the power consumption as determined by said means for determining power consumption due to said through-current and the power consumption as determined by said means for determing power consumption caused by said load capacitance.

3. Apparatus for computing power consumption in an MOS transistor logic function block according to claim 2, further comprising:

means for multiplying a power consumption in an operation cycle of each logic function block by a number of operating cycles in unit time to obtain a plurality of results, and means for summing said plurality of results of respective logic function blocks.

4. Apparatus for computing power consumption in an MOS transistor logic function block, comprising:

circuit information deriving means for deriving circuit information appropriate for a logic function block of interest based on a plurality of input and output varying signals to and from said logic function block, a plurality of load capacitance data, and a net list;

slew rate determining means for determining an input slew rate based on information from said circuit information deriving means;

a memory section containing a plurality of expressions for use in computation of power consumption caused by a through-current, each expression corresponding to a different one of various types of logic function blocks and representing power consumption caused by said through-current as a function of said input slew rate and said plurality of load capacitance data; and means for determining power consumption due to said through-current by substituting the said input slew rate as determined by said slew rate determining means and said plurality of load capacitance data into a computation expression as read from said memory section.

5. Apparatus for computing power consumption in an MOS transistor logic function block according to claim 4, further comprising:

means for determining power consumption caused by a load capacitance; and means for summing the power consumption as determined by said means for determining power consumption due to said through-current and the power consumption as determined by said means for determining power consumption caused by said load capacitance.

6. Apparatus for computing power consumption in an MOS transistor logic function block according to claim 5, further comprising:

means for multiplying a power consumption in an operation cycle of each logic function block by a number of operating cycles in unit time to obtain a plurality of results, and means for summing said plurality of results of respective logic function blocks.

7. A method for computing a total power consumption in a plurality of MOS transistor logic function blocks, comprising the steps of:

deriving circuit information for each of said logic function blocks;

said circuit information including a plurality of load capacitances, one load capacitance for each of said logic function blocks;

said circuit information including a plurality of input signal changes, one input signal change for each logic function block;

said circuit information including a plurality of output signal changes, one output signal change for each logic function block;

determining an input slew rate for each of said logic function blocks;

storing a plurality of formulas for computing a first plurality of power consumptions;

a different one of each of said formulas associated with a different type of logic function block;

said plurality of formulas being expressed as a function of said input slew rate;

computing said first plurality of power consumptions;

computing a second plurality of power consumptions;

summing said first plurality of power consumptions to obtain a through-current power consumption;

summing said second plurality of power consumptions to obtain a load capacitance power consumption; and summing said load capacitance power consumption and said through-current power consumption to obtain a total power consumption.

8. A method for computing a total power consumption in a plurality of MOS transistor logic function blocks, comprising the steps of:

deriving circuit information for each of said logic function blocks;

said circuit information including a plurality of load capacitances, one load capacitance for each of said logic function blocks;

said circuit information including a plurality of input signal changes, one input signal change for each logic function block;

said circuit information including a plurality of output signal changes, one output signal change for each logic function block;

determining an input slew rate for each of said logic function blocks;

storing a plurality of formulas for computing a first plurality of power consumptions;

a different one of each of said formulas associated with a different type of logic function block;

said plurality of formulas being expressed as a function of said input slew rate and said load capacitance;

computing said first plurality of power consumptions;

computing a second plurality of power consumptions;

summing said first plurality of power consumptions to obtain a through-current power consumption;

summing said second plurality of power consumptions to obtain a load capacitance power consumption; and summing said load capacitance power consumption and said through-current power consumption to obtain a total power consumption.

9. Apparatus for measuring power consumption of a logic device comprising:

means for determining an input slew rate of an input signal to said logic device;

means, responsive to said slew rate, for calculating a first power consumption resulting from a through-current of said logic device;

means for calculating a second power consumption resulting from a charging current of said logic device; and means for summing said first power consumption and said second power consumption to provide a total power consumption of said logic device.

10. The apparatus of claim 9, wherein said means, responsive to said slew rate, includes means for applying a formula $$W_p = b + mt,$$

where $W_p$ is said power consumption, t is said slew rate, and b and m are constants.

11. Apparatus for measuring power consumption of a logic device comprising:

means for determining an input slew rate of an input signal to said logic device;

first means, responsive to said slew rate, for calculating a first power consumption resulting from a through-current of said logic device;

second means, responsive to said slew rate, for calculating a second power consumption resulting from said through-current of said logic device;

third means for calculating a third power consumption resulting from a charging current of said logic device;

and means, for summing said first power consumption, said second power consumption, and said third power consumption, to provide a total power consumption of said logic device.

12. Apparatus according to claim 11, wherein said first and second means include means for applying a formula $$W_P = \alpha + \beta t - \gamma t c,$$

where $W_P$ is a power consumption, $t$ is said slew rate, $c$ is a load capacitance, and $\alpha$, $\beta$, and $\gamma$ are constants.

* * * * *